US009062238B2

(12) United States Patent
Kesavan et al.

(10) Patent No.: US 9,062,238 B2
(45) Date of Patent: Jun. 23, 2015

(54) METHODS AND COMPOSITIONS FOR VISCOSIFYING HEAVY AQUEOUS BRINES

(75) Inventors: Subramanian Kesavan, East Windsor, NJ (US); Manilal S. Dahanayake, Princeton Junction, NJ (US); Gary Woodward, Northwich Cheshire (GB)

(73) Assignee: RHODIA OPERATIONS, Aubervilliers (FR)

( * ) Notice: Subject to any disclaimer, the term of this patent is extended or adjusted under 35 U.S.C. 154(b) by 104 days.

(21) Appl. No.: 12/802,368

(22) Filed: Jun. 4, 2010

(65) Prior Publication Data

US 2010/0311621 A1 Dec. 9, 2010

Related U.S. Application Data

(60) Provisional application No. 61/217,815, filed on Jun. 4, 2009.

(51) Int. Cl.
| | |
|---|---|
| *C09K 8/90* | (2006.01) |
| *C09K 8/08* | (2006.01) |
| *C09K 8/40* | (2006.01) |
| *C09K 8/66* | (2006.01) |
| *C09K 8/68* | (2006.01) |

(52) U.S. Cl.
CPC ... *C09K 8/08* (2013.01); *C09K 8/40* (2013.01); *C09K 8/665* (2013.01); *C09K 8/68* (2013.01); *C09K 8/90* (2013.01)

(58) Field of Classification Search
CPC ..... E21B 47/022; E21B 47/122; E21B 47/14; E21B 47/16; E21B 49/00; E21B 49/008; E21B 4/02; E21B 7/061; E21B 19/08; E21B 21/08; E21B 33/12; E21B 43/08; E21B 43/12; E21B 43/14; E21B 47/12; E21B 10/5735; E21B 17/18; E21B 17/203; E21B 2034/002; E21B 21/00; E21B 23/01; E21B 29/08; E21B 33/035; C09K 8/12; C09K 8/426; C09K 8/52; C09K 8/68; C09K 8/70; C09K 8/80; C09K 8/882
See application file for complete search history.

(56) References Cited

U.S. PATENT DOCUMENTS

| | | | | |
|---|---|---|---|---|
| 3,472,840 | A | 10/1969 | Stone et al. ............. 260/231 |
| 3,892,275 | A * | 7/1975 | Lybarger et al. ......... 166/250.01 |
| 4,026,361 | A * | 5/1977 | Knapp et al. .............. 166/281 |
| 4,031,307 | A | 6/1977 | DeMartino et al. ......... 536/114 |
| 4,330,414 | A | 5/1982 | Hoover ..................... 252/8.5 |
| 4,392,964 | A | 7/1983 | House et al. ............... 52/8.5 |
| 4,415,463 | A | 11/1983 | Mosier et al. ............. 252/8.55 |
| 4,420,406 | A | 12/1983 | House et al. ............. 252/8.55 R |
| 4,435,564 | A | 3/1984 | House ..................... 536/87 |
| 4,439,333 | A | 3/1984 | House et al. ............. 252/8.55 R |
| 4,486,340 | A * | 12/1984 | Glass, Jr. ................. 507/216 |
| 4,613,631 | A | 9/1986 | Espenscheid et al. ........ 523/130 |
| 4,658,898 | A | 4/1987 | Paul et al. ................ 166/270 |
| 4,663,159 | A | 5/1987 | Brode, II et al. ............ 424/70 |
| 4,702,848 | A | 10/1987 | Payne ...................... 252/8.551 |
| 5,009,798 | A | 4/1991 | House et al. .............. 252/8.551 |
| 5,037,930 | A | 8/1991 | Shih ........................ 527/301 |
| 5,387,675 | A | 2/1995 | Yeh ........................ 536/18.7 |
| 5,473,059 | A | 12/1995 | Yeh ........................ 536/18.7 |
| 6,346,588 | B1 | 2/2002 | Frenchl et al. ............. 526/218.1 |
| 7,347,265 | B2 | 3/2008 | Monroe et al. ............. 166/294 |
| 2006/0199741 | A1 | 9/2006 | Araki et al. ................ 507/114 |
| 2007/0042913 | A1 | 2/2007 | Hutchins et al. ........... 507/269 |
| 2007/0111897 | A1 * | 5/2007 | Dahanayake et al. ........ 507/211 |

FOREIGN PATENT DOCUMENTS

| | | | | |
|---|---|---|---|---|
| GB | 2 098 258 A | 2/1982 | ............. C09K 7/02 |
| WO | WO 02/070862 A1 | 12/2002 | ............. E21B 43/26 |

OTHER PUBLICATIONS

Gomez G, Pikal M.J, Rodriquez-Hornedon N, Effect of initial buffer composition on pH changes during far-from-equilibrium freezing of sodium phosphate buffer solutions, Pharmaceutical Research, 2001, 18, 90-97).*
Gomez G, Pikal M.J, Rodriquez-Hornedon N, Effect of initial buffer composition on pH changes during far-from-equilibrium freezing of sodium phosphate buffer solutions, Pharmaceutical Research, 2001, 18, 90-97.*
Buffer solution—Wikipedia, the free encyclopedia, http://en.wikipedia.org/wiki/Buffer_solution (downloaded on Feb. 13, 2014).*
Spectrum Chemical & Laboratory product description http://www.innovadex.com/PersonalCare/Detail/4230/122404/Triethanolam... downloaded on Feb. 22, 2014.*

* cited by examiner

*Primary Examiner* — Susannah Chung
*Assistant Examiner* — Kumar R Bhushan
(74) *Attorney, Agent, or Firm* — Xuping Fu

(57) ABSTRACT

A method for viscosifying brine systems utilized in oilfield applications comprising: a) preparing a heavy brine system comprising obtaining an aqueous brine system comprising a hydrated polysaccharide and at least one multivalent salt, wherein the density of the aqueous brine system is greater than about 10 pounds per gallon (ppg), and adding an effective amount of an alkaline agent, thereby increasing the viscosity of the brine system. Also disclosed are methods for viscosifying brine systems utilized in well servicing applications comprising obtaining an aqueous brine solution comprising at least one multivalent salt, wherein the density of the aqueous brine system is greater than about 10 pounds per gallon (ppg); adding a polysaccharide; adding an effective amount of an acid buffering agent to the brine system to lower the pH of the brine system, whereby the polysaccharide is capable of substantially hydrating into the brine system; and adding an effective amount of an alkaline agent, thereby substantially increasing the viscosity of the brine system.

29 Claims, No Drawings

METHODS AND COMPOSITIONS FOR VISCOSIFYING HEAVY AQUEOUS BRINES

CROSS-REFERENCE TO RELATED APPLICATIONS

The application claims benefit of U.S. Provisional Application No. 61/217,815, filed on Jun. 4, 2009, herein incorporated by reference.

FIELD OF THE INVENTION

The present invention relates to compositions and methods for viscosifying heavy brine systems and, in particular, viscosifying heavy brine compositions comprising cationic polysaccharides.

DESCRIPTION OF THE RELATED ART

Thickened aqueous media, particularly those containing oil field brines, can be used in oilfield applications or well bore treatments. Oilfield applications or well bore treatments can include, among others, processes that utilize well servicing fluids such as drilling fluids, workover fluids, completion fluids, packer fluids, well treating fluids, subterranean formation treating fluids, fracturing fluids, spacer fluids, hole abandonment fluids, and other aqueous fluids in which an increase in viscosity is desired.

For example, workover fluids are those fluids used during remedial work in a drilled well. Such remedial work includes removing tubing, replacing a pump, cleaning out sand or other deposits, logging, etc. Workover also broadly includes steps used in preparing an existing well for secondary or tertiary recovery such as polymer addition, micellar flooding, steam injection, etc. Fracturing fluids are used in oil recovery operations where subterranean formations are treated to create pathways for the formation fluids to be recovered.

As another example, completion fluids are those fluids used during drilling, completion, or recompletion, of the well. Completion operation normally includes perforating the casing, setting the tubing and pumps in petroleum recovery operations. Both workover and completion fluids are used in part to control well pressure, to prevent the well from blowing out during completion or workover, or to prevent the collapse of well casing due to excessive pressure build-up.

Polymers and chemicals are added to the brines used in well servicing fluids for various reasons that include, but are not limited to, increasing viscosity, and increasing the density of the brine. For example, in order to obtain brine having a salinity of about 10 to 19.5 pounds per gallon (ppg), or about 1.2 to 2.3 grams per milliliter (g/ml), water-soluble salts such as ionic salts of calcium, magnesium and zinc are often added to the brine. Water-thickening polymers serve to increase the viscosity of the brines and thus retard the migration of the brines into the formation and lift drilled solids from the wellbore. Another advantage of using heavy brines is the ability to penetrate deeper in oil formations.

Polysaccharides such as hydroxyethyl cellulose (HEC), carboxylmethylhydroxyethyl cellulose, carboxymethyl cellulose (CMC) and synthetic polymers such as polyacrylamides (PAM) are used to increase the viscosity of brines.

Among the problems in using cellulose polysaccharides such as HEC in thickening is the formation of clumps referred to as "fish eyes" due to poor hydration that can cause clogging and formation damage. HEC and such other polysaccharides surface-hydrate too rapidly and non-uniformly, resulting in clumps. Many of these polysaccharides hydrate only after elevating the temperature of the brine and when these are normally supplied dry powders require special preparation and/or mixing and dispersing equipment when added to brines. Further, exposure to higher down-hole temperatures that dissolve the clumps cause brine viscosities to fluctuate resulting in unpredictable and undesirable latent viscosities. Moreover, many of the polysaccharides also tend to form separate gummy polymer layers in high density brines, particularly in the range of densities of 10 to 19.5 ppg.

Given the above, there is a need for an improved method of viscosifying heavy brines. It is desirable to have a natural polymer such as polysaccharide that viscosifies heavy brines containing water soluble salts in oilfield applications without the use of additives and/or additional treatment steps prior to mixing with the heavy brines. For example, additional steps including treatment of the polysaccharides with additives in substantial amounts of solvent media that increases the risk of flammability It is also desirable to viscosify heavy brines using a minimum amount of polysaccharide. In particular, it is desirable to utilize a process that viscosfies heavy brine particularly in the range of densities of 10 ppg to 19.5 ppg without the use of traditional crosslinkers or additives. In accordance with the present invention, there is provided a method of utilizing and viscosifying heavy brine compositions containing water soluble salts and a cationic polysaccharide for oilfield applications.

SUMMARY OF THE INVENTION

In one aspect, the present invention is a method for viscosifying brine systems utilized in oilfield applications comprising: obtaining or preparing a brine system comprising a mixture of a polysaccharide and at least one water soluble divalent or multivalent salt, wherein the density of the brine system is greater than about 10 pounds per gallon (ppg) and the pH of the brine system is less than about 7; and adding an effective amount of an alkaline buffering agent, whereby the viscosity of the brine system is increased. In one embodiment, the viscosity of the brine system is increased substantially by adding the alkaline buffering agent, typically by a factor of 2 or greater, more typically by a factor of 4 or greater, even more typically by a factor of 5 or greater.

In one aspect, the present invention is a method for viscosifying brine systems utilized in well servicing applications comprising: a) obtaining an aqueous brine system comprising a hydrated polysaccharide and at least one multivalent salt, wherein the density of the aqueous brine system is greater than about 10 pounds per gallon (ppg) and wherein the pH of the brine system is less than about 7; and b) adding an effective amount of an alkaline agent, thereby increasing the viscosity of the brine system. In one embodiment, the pH of the brine system in step a) is less than about 5 and, in another embodiment, is less than about 4. In one embodiment, the pH of the brine system in step b) is increased to from about 4 to greater than about 6 and, in another embodiment, is increased from 5 to greater than about 8.

In another aspect, the present invention is a method for viscosifying brine systems utilized in well servicing applications comprising a) obtaining an aqueous brine solution comprising at least one multivalent salt, wherein the density of the aqueous brine system is greater than about 10 pounds per gallon (ppg); b) adding a polysaccharide; c) adding an effective amount of an acid buffering agent to the brine system to lower the pH of the brine system, whereby the polysaccharide is capable of substantially hydrating into the brine system;

and d) adding an effective amount of an alkaline agent, thereby substantially increasing the viscosity of the brine system.

The alkaline agent can be any suitable alkaline buffering solution or a suitable base. In one embodiment, the alkaline agent is selected from the group consisting of amines, alkali metal glycerophosphates, alkali metal orthophosphates, alkali metal hydroxides, carbonates, alkanolamines, silicates, citrates, acetates, phosphates, buffering solutions thereof and mixtures thereof. In one particular embodiment, the alkaline agent is an alkanolamine, typically, a triethanolamine, diethanolamine or monoethanolamine. In one embodiment, the alkaline buffer is an aqueous solution of disodium phosphate and monosodium phosphate. The acid buffering agent can be any suitable acid buffer or acid, including but not limited to sulfuric acid, citric acid, acetic acid, formic acid, lactic acid, malic acid, glycolic acid, tartaric acid, nitric acid, hydrochloric acid, sulfamic acid, phosphoric acid, oxalic acid, sodium bisulfate, any buffer solution containing the foregoing or any mixture thereof.

In one embodiment, the multivalent salt comprises a calcium salt, a magnesium salt, a formate salt, a ferrous salt, a zinc salt or a mixture thereof. In another embodiment, the multivalent salt comprises calcium chloride, calcium bromide, calcium iodide, calcium sulfate, magnesium chloride, magnesium bromide, magnesium iodide, magnesium sulfate, calcium formate, magnesium formate, zinc formate, zinc chloride, zinc bromide, zinc iodide, zinc sulfate or any mixture thereof. Water soluble salts can also include ferrous sulfate, chloride and gluconate, calcium chloride, lactate and glycerophosphate.

The polysaccharide is present in an amount from about 0.01 wt % to about 10 wt % based on the total weight of the brine system. In one embodiment, the polysaccharide is present in an amount from about 0.01 wt % to about 2 wt % based on the total weight of the brine system.

In a further aspect, the present invention is a method for preparing a viscosified brine system utilized in a well servicing applications comprising: a) adding a polysaccharide to an aqueous brine solution, the brine solution comprising: (i) at least one multivalent water soluble salt, (ii) characterized by a density of between about 10 pounds per gallon (ppg) and 20 ppg, and (iii) a pH value of less than about 7, whereby the polysaccharide is capable of substantially hydrating into the brine solution; and b) adding an alkaline agent to increase the pH of the brine solution, thereby substantially increasing the viscosity of the brine system. In one embodiment, the brine solution has a density of from about 14 ppg to about 19.5 ppg.

In one embodiment, the polysaccharide is a cationic polysaccharide is prepared by the reaction of a reactive quaternary ammonium compound with a polysaccharide or polysaccharide derivative selected from the group consisting of guar, hydroxyalkyl guar, carboxyalkyl guar, carboxyalkyl hydroxyalkyl guar, hydrophobically modified guar, hydrophobically modified hydroxyalkyl guar, hydrophobically modified carboxyalkyl guar, hydrophobically modified carboxyalkyl hydroxyalkyl guar, pectin, alginates, locust bean gum, gum arabic, gum ghatti, gum acacia, carrageenan, hydroxyalkyl cellulose, carboxyalkyl hydroxyalkyl cellulose, carboxyalkyl cellulose, alkyl ethers of cellulose, hydroxyalkyl methyl cellulose, hydrophobically modified hydroxyalkyl cellulose, hydrophobically modified carboxyalkyl hydroxyalkyl cellulose, hydrophobically modified carboxyalkyl cellulose, hydrophobically modified alkyl ethers of cellulose, hydrophobically modified hydroxyalkyl methyl cellulose, starch, gum tragacanth, gum karaya, tara gum, tamarind gum, xanthan gum, welan gum, and succinoglucans, and mixtures thereof. In one embodiment, the cationic polysaccharide is cationic guar, typically, hydroxyalkyltrimethylammonium guar. The cationic polysaccharide can have a weight average molecular weight from about 100,000 to about 3,000,000 Daltons. In another embodiment, the cationic polysaccharide has a weight average molecular weight from about 1,000,000 to about 2,000,000 Daltons.

In one embodiment, the viscosified brine system has a viscosity of from about 100 to about 15000 cps @ 100/sec. In another embodiment, the viscosified brine system has a viscosity of from about 200 to about 5000 cps @ 100/sec.

In yet another aspect, the present invention is a method for preparing a viscosified brine system utilized in well servicing applications comprising: a) adding a polysaccharide to an aqueous brine solution, the brine solution comprising: (i) at least one multivalent water soluble salt, (ii) a density between about 10 pounds per gallon (ppg) and 20 ppg; b) adding an effective amount of an acid to the brine solution, whereby the polysaccharide is capable of substantially hydrating into the brine solution; and c) adding a alkaline agent to the brine system to increase the pH of the brine system to greater than 6, the alkaline agent capable of viscosifying the brine system. The acid can be any suitable acid or acid buffer solution.

DETAILED DESCRIPTION OF THE INVENTION

The present invention deals with increasing the viscosity of a salt brine by contacting a polysaccharide with the brine so that the resulting viscosified brine system can be used in workover, drilling, fracturing and completion fluids. The present invention also deals with increasing the viscosity of a brine system by increasing the pH of the brine system (containing a polysaccharide and water soluble salt, typically a multivalent salt) by utilizing an alkaline buffering agent.

Heavy brines used in oil field operations have densities ranging from about 10 ppg to about 20 ppg (pounds per gallon). Typically, heavy brines have densities ranging from about 14 ppg to about 20 ppg. In some embodiments, heavy brines have densities ranging from about 15 ppg to about 19.5 ppg. In other embodiments, heavy brines have densities ranging from about 16 ppg to about 19.5 ppg.

The heavy brines used in the present invention generally comprise water which naturally contains water-soluble salts. However, it is understood that the brines utilized in the present invention can comprise a brine solution where water soluble salts are added to achieve the desired density, or a mixture of water containing naturally occurring water soluble salts and water containing added salts (i.e., a concentrated brine), or a naturally occurring brine where a water soluble salt is added to achieve the desired density. The added water-soluble salts may be different to the water-soluble salts naturally present in the water.

In one embodiment, the salts can be any suitable divalent or multivalent water soluble salts including but not limited to calcium salts, magnesium salts and zinc salts. The multivalent water soluble salts of the present invention include but are not limited to calcium chloride, calcium bromide, calcium iodide, calcium sulfate, magnesium chloride, magnesium bromide, magnesium iodide, magnesium sulfate, calcium formate, magnesium formate, zinc formate, zinc chloride, zinc bromide, zinc iodide, zinc sulfate; as well as ferrous sulfate, chloride and gluconate; calcium chloride, lactate and glycerophosphate; zinc sulfate and chloride; and magnesium sulfate and chloride; or any mixtures thereof. In one particular embodiment, the multivalent water soluble salt is a calcium salt, such as calcium chloride, calcium bromide and calcium sulfate. In another embodiment, the multivalent water soluble salts are zinc salts including but not limited to zinc chloride and zinc bromide because of low cost and ready availability.

According to the present invention, the weight (wt) % of the water soluble salts in the heavy brine can vary widely from about 5 wt % to about 90 wt % based on the weight of the brine, in other embodiments the wt % of the water soluble salts in the heavy brine are from about 10 wt % to about 80 wt % based on the weight of the brine, in other embodiments the wt % of the water soluble salts in the heavy brine are from about 10 wt % to about 75 wt % based on the weight of the brine, in other embodiments the wt % of the water soluble salts in the heavy brine are from about 20 wt % to about 60 wt % based on the weight of the brine.

Typically, zinc salts vary from about 10 wt % to about 50 wt % based on the weight of the brine, more preferably from about 30 wt % to about 50 wt %. The brine can also contain a variety of monovalent, divalent and multivalent salts, for example brines having naturally occurring salts where multivalent salts are added to increase the density of the brine to the desired level. Examples of monovalent and divalent salts include but not limited to sodium chloride, sodium bromide, potassium chloride, potassium bromide, zinc chloride, zinc bromide, calcium chloride, calcium bromide, and magnesium chloride, and mixtures thereof. Typically, calcium salts vary from about 1 wt % to about 55 wt % based on the weight of the brine, and more typically from 10 wt % to about 55 wt %. Typically, the weight % of the total dissolved solids in the brine is in the range from about 10 wt % to about 80 wt %, more typically from about 30 wt % to about 80 wt %.

Suitable polysaccharides include but are not limited to agar, agar derivatives, alginates, alginate derivatives, amylose, amylose derivatives, arabic/acacia gum, arabica/acacia gum derivates, arabinogalactan, arabinogalactan derivatives, benzoin gum, benzoin gum derivatives, carob gum, carob gum derivatives, carrageenan, carrageenan derivatives, cassia gum, cassia gum derivatives, cellulose, cellulose derivatives (including but not limited to methyl cellulose, hydroxylbutyl cellulose, hydroxypropyl cellulose, and mixtures thereof), chitin, chitin derivatives, damar, damar derivatives, dextran, dextran derivatives, dextrin, dextrin derivatives, gellan gum, gelan gum derivatives, gelatin, ghatti gum, ghatti gum derivatives, guar gum, guar gum derivatives, karaya gum, karaya gum derivatives, levan, levan derivatives, locust bean gum, locust bean gum derivatives, pectin, pectin derivatives, pullulan, pullulan derivatives, rhamsan gum, rhamsan gum derivatives, sandarac gum, sandarac gum derivatives, starch, starch derivatives, succinoglucan, succinoglucan derivatives, tamarind gum, tamarind gum derivatives, tara gum, tara gum derivatives, tragacanth gum, tragacanth gum derivatives, xanthan gum, and xanthan gum derivatives.

In one embodiment, cationic polysaccharides are utilized, which include but are not limited to any naturally occurring cationic polysaccharide as well as polysaccharides and polysaccharide derivatives that have been cationized by chemical means, e.g. quaternization with various quaternary amine compounds containing reactive chloride or epoxide sites. Methods for preparation of the cationic polysaccharides are disclosed in U.S. Pat. Nos. 4,663,159; 5,037,930; 5,473,059; 5,387,675; 3,472,840 and 4,031,307, all of which are incorporated herein by reference. Cationic derivatives are obtained by reaction between the hydroxyl groups of the polysaccharide and reactive chlorides or epoxide sites. The degree of substitution of the cationic groups onto the guar structure must be sufficient to provide the requisite cationic charge density.

Examples of cationized polysaccharides include, but are not limited to, polysaccharides and polysaccharide derivatives selected from the group consisting of guar, hydroxyalkyl guar, carboxyalkyl guar, carboxyalkyl hydroxyalkyl guar, hydrophobically modified guar, hydrophobically modified hydroxyalkyl guar, hydrophobically modified carboxyalkyl guar, hydrophobically modified carboxyalkyl hydroxyalkyl guar, pectin, alginates, locust bean gum, gum arabic, gum ghatti, gum acacia, carrageenan, hydroxyalkyl cellulose, carboxyalkyl hydroxyalkyl cellulose, carboxyalkyl cellulose, alkyl ethers of cellulose, hydroxyalkyl methyl cellulose, hydrophobically modified hydroxyalkyl cellulose, hydrophobically modified carboxyalkyl hydroxyalkyl cellulose, hydrophobically modified carboxyalkyl cellulose, hydrophobically modified alkyl ethers of cellulose, hydrophobically modified hydroxyalkyl methyl cellulose, starch, gum tragacanth, gum karaya, tara gum, tamarind gum, xanthan gum, welan gum, and succinoglucans, and mixtures thereof.

In one embodiment, the cationic polysaccharide is guar having cationic functional groups including but not limited to hydroxyalkyltrimethylammonium, typically, hydroxypropyltrimethylammonium, and alkyltrimethylammonium groups. Typically, the total molar substitution is at least 0.1.

In one embodiment, the cationic polysaccharides are cationic guars and cationic hydroxy alkyl guars such as cationic hydroxy propyl guar and cationic hydroxy ethyl guar that are derived from naturally renewable resources, which are more environmentally acceptable as compared to synthetic polymers. Examples of cationic guar gum include a hydroxypropyl trimethylammonium chloride guar derivative prepared by the reaction of guar gum with N-(3-chloro-2-hydroxypropyl) trimethylammonium chloride. Ratio of the hydroxypropyl trimethyl ammonium chloride moiety to guar gum saccharide unit can be 0.03 to 0.5, typically 0.15 to 0.25. More typically, the cationic guar polymer is guar hydroxypropyltrimethylammonium chloride. Specific non-limiting examples of cationic guar polymers include: Jaguar®. C 13S, having a cationic charge density of about 0.8 meq/g (manufactured by Rhodia Inc.) and Jaguar®. C 17, having a cationic charge density of about 1.6 meq/g (manufactured by Rhodia Inc., Cranbury, N.J.).

Further, cationic guars that facilitate easier recovery of the polymers compared to PAM once the operation is completed in well servicing fluids are preferred. Most preferred are the cationic guars that have lower tendency to adsorb or precipitate in subterranean formations minimizing long term damage to the formations. The weight average molecular weight of cationic guars suitable for the present invention is greater than 1,000,000, typically greater than 2,000,000. In one embodiment, the weight average molecular weight is greater than about 3,000,000. In one embodiment, the weight average molecular weight is from about 100,000 to about 3,000,000. In another embodiment, the weight average molecular weight is from about 300,000 to about 2,500,000.

Any anionic counterions may be use in association with the cationic guars. The cationic guars should remain soluble in the brine, and so long as the counterions are physically and chemically compatible with zinc compounds and do not otherwise unduly impair performance and stability. Non-limiting examples of such counterions include: halides (e.g., chloride, fluoride, bromide, iodide), sulfate, methylsulfate, and mixtures thereof.

According to the present invention, any suitable means such as, for example, mixing with a typical oil field drilling fluid mixing equipment, can be used for the contacting of the cationic polysaccharide to viscosify the brines. Such contacting or mixing of the cationic polysaccharide can be in the presence of, or in absence of, a surfactant. Typically, in order to sufficiently hydrate the cationic polysaccharide, which in one embodiment is a cationic guar, the brine system should be made sufficiently acidic.

The viscosified brines having a desired viscosity can be used as well servicing fluids in oil field operations by those skilled in the art. Generally, the well servicing fluids comprising the viscosified brines can be used in any drilled wells having a temperature in the range from about 80° F. to about 300° F. Such well servicing fluids have viscosities, in one embodiment, from about 200 cps to about 15000 cps. In another embodiment, such well servicing fluids have viscosities from about 200 cps to about 10000 cps @ 100/sec. In another embodiment, such well servicing fluids have viscosities from about 300 cps to about 5000 cps @ 100/sec. In another embodiment, such well servicing fluids have viscosities from about 300 cps to about 4000 cps @ 100/sec.

Thus, in one embodiment, the present invention is a method for viscosifying aqueous brine systems utilized in oilfield applications comprising first hydrating a polysaccharide into a brine solution. The aqueous brine solution contains at least one water soluble salt and may already have an acidic pH such that the polysaccharide can fully or substantially hydrate into the brine solution. Alternatively, the brine solution contains at least one water soluble salt, but is not at a pH sufficient to fully or substantially hydrate the polysaccharide into the brine solution. If the pH is not sufficient to hydrate the polysaccharide, the pH of the brine solution should be lowered using an effective amount of an acid, which includes an acid and/or acid buffer. The effective amount varies depending on the type of acid or acid buffer used and the pH of the existing brine solution. However, it is understood that, in one embodiment, the effective amount is the amount necessary to lower the pH of the brine solution to less than about 7.

Once the polysaccharide is fully or substantially hydrated into the brine solution, an alkaline agent, which can be a base and/or alkaline buffering solution is added to the brine system. The brine system, in one embodiment, comprises a brine solution having one or more water soluble multivalent salts, acid or acid buffer and hydrated polysaccharide. (In other embodiments, the brine system comprises an aqueous brine solution of one or more water-soluble salts and an acid or acid buffer.)

The alkaline agent, which may be a base or alkaline buffer solution, is added to the brine system to increase the pH of the brine system. An increase of the pH of the brine system correlates to an increase in viscosity of the brine system. A description of the polysaccharides and water soluble salts utilized in the present invention have been described above. The alkaline buffering agent will be described below. In one embodiment, the density of the brine system is greater than about 10 ppg. In some embodiments, the density of the brine system is between about 10 and about 20 ppg, more typically, between about 14 ppg and 19.5 ppg. In one embodiment, the density of the brine system is between about 16 and 20 ppg.

The pH of the brine system after addition of the acid or acid buffer is less than about 7.5, in one embodiment is less than about 7, in one embodiment is less than about 6.5, in one embodiment is less than about 6, in another embodiment is less than about 5.5, in one embodiment is less than about 5, in one embodiment is less than about 4.5, and in another embodiment is less than 4. In one embodiment, the pH of the brine system after addition of the acid or acid buffer is about 3.5. In yet another embodiment, the pH of the brine system after addition of the acid or acid buffer is about 3, and in another embodiment, is less than about 2.5.

The pH of the brine system that contains naturally occurring water soluble salts can be adjusted through the addition of an acid to the brine system. As mentioned previously, in order to sufficiently hydrate the polysaccharide into the brine system, an acid or acid buffer solution should be utilized. It is understood that the acid or acid buffer can be added to the brine before the addition of the polysaccharide, concurrently with the addition of the polysaccharide or after the addition of the polysaccharide, so long as the polysaccharide is hydrated into the brine prior to the addition of the alkaline agent.

In one embodiment the acid buffer solution is an aqueous solution of acetic acid and sodium acetate, which is added to the brine system concurrently with, before, or after the addition of the polysaccharide, which is typically a cationic guar.

In one embodiment, a 25% acid buffer solution is added to the brine-polymer system. In one embodiment, between about 0.1 to about 3 ml of the 25% acid buffer solution is added to about 200 g of the brine solution. In another embodiment, between about 0.1 to about 2 ml of the 25% acid buffer solution is added to about 200 g of the brine solution. In yet another embodiment, between about 0.1 to about 1 ml of the 25% acid buffer solution is added to about 200 g of the brine solution.

It is understood, however, that other acid solutions and acid buffer solutions may be utilized including but not limited to sulfuric acid, citric acid, acetic acid, formic acid, lactic acid, malic acid, glycolic acid, tartaric acid, nitric acid, hydrochloric acid, sulfamic acid, phosphoric acid, oxalic acid, sodium bisulfate, a acid buffer solution containing any of the foregoing and the like. The selection and amount of acid utilized to provide the resulting acidic effect and/or a desired pH may be dependent upon the "strength" of the acid. Typically, the pH of the polymer-brine system is lowered to a pH of about 3 to sufficiently hydrate the polysaccharide.

It has been found that after hydrating a polysaccharide (e.g., cationic guar solution) in the brine-polymer system which contains a multivalent water soluble salt (e.g., in 11.5 ppg calcium chloride), an increase in the pH of the polymer-brine solution increases the viscosity of the polymer-brine solution. While not being bound by theory, it is believed that increasing the pH of the solution causes intermolecular crosslinking between the polysaccharide polymers via the water soluble multivalent salt. This intermolecular crosslinking, in turn, increases the viscosity of the polymer-brine solution.

Typically, buffering agents are utilized to increase the pH of the polymer-brine solution. Buffering agents generally refer to agents that can be used to adjust the pH of the compositions to a range of about pH 6.5 to about pH 10.

In one embodiment, the pH of the polymer-brine solution is increased from about a pH of less than 5 to a pH of greater than above 8 using an alkaline agent. In another embodiment, the pH of the polymer-brine solution is increased from about a pH of less than 4 to a pH of greater than above 6 using an alkaline agent. In another embodiment, the pH of the polymer-brine solution is increased from about a pH of less than 4 to a pH of greater than above 7 or 8 using an alkaline agent. In yet another embodiment, the pH of the polymer-brine solution is increased from about a pH of 3 to about a pH of greater than about 6 or about 6.5 using an alkaline agent. In another embodiment, the pH of the polymer-brine solution is increased from about a pH of less than 3 to a pH of greater than above 7 using an alkaline agent. In yet another alternative embodiment, the pH of the polymer-brine solution is increased from about a pH of less than 3 to a pH of greater than above 8 using an alkaline agent.

Suitable alkaline agents include but are not limited to amines; alkali metal glycerophosphates; alkali metal orthophosphates; alkali metal hydroxides including but not limited to sodium hydroxide and potassium hydroxide; carbonates; alkanolamines, including but not limited to trialkanolamines, dialkanolamines and monoalkanolamines; silicates; citrates; acetates; and phosphates, including but not limited to monosodium phosphate and trisodium phosphate; as well as alkaline buffer solutions containing any of the foregoing and the like. In one embodiment, the buffering agent is triethanolamine or diethanolamine. Alkaline agents are used at a range of from about 0.1% to about 30%, preferably from about 1% to about 10%, and more preferably from about 1.5% to about 3%, by weight of the brine system.

Inorganic pyrophosphate salts are also suitable as alkaline agents. The pyrophosphate salts include but are not limited to dialkali metal pyrophosphate salts, tetra alkali metal pyrophosphate salts, buffering solution thereof and mixtures thereof.

In one embodiment, crosslinking of the polysaccharide takes place without the addition of one or more crosslinking agents. Thus, the polymer-brine solution typically contains no or trace amounts of crosslinking agents such as borax, zirconium or titanium, among others. In other embodiments, crosslinking of the polysaccharides take place in the presence of a small or trace amount of one or more crosslinking agents. Generally, zirconium, titanium or boron are utilized as crosslinking agents that can be used to crosslink cationic polysaccharides prepared from polysaccharides such as guar gum and its derivatives, including hydroxypropyl guar (HPG), carboxymethyl guar (CMG) and carboxymethylhydroxypropyl guar (CMHPG).

Suitable titanium compounds used as crosslinking agents, for example, are those titanium (II), titanium (III), titanium (IV), and titanium (VI) compounds that are soluble in the aqueous medium. In one embodiment, the titanium compound is a titanium (IV) compound, that is, a titanium compound in which the titanium atoms of the compound are in the +4 oxidation state. In one embodiment, the titanium compound is a titanium salt, more typically a water soluble titanium salt, such as titanium tetrachloride, titanium tetrabromide, or tetra amino titanate. In one embodiment, the titanium compound comprises one or more titanium chelates. Suitable titanium chelates are commercially available and include, for example, titanium acetylacetonates, triethanolamine titanates, and titanium lactate. In one embodiment, the titanium compound comprises one or more titanium esters. Suitable titanium esters are commercially available and include, for example, n-butyl polytitanates, titanium tetrapropanolate, octyleneglycol titanates, tetra-n-butyl titanates, tetra-n-buytl titanates, tetra-2-ethylhexyl titanates, tetra-isopropyl titanate, and tetra-isopropyl titanate.

In another embodiment, the titanium compound includes but is not limited to ammonium titanium carbonate, titanium acetylacetonate, titanium acetylacetonate, titanium ethylacetoacetate, titanium triethanolamine, ammonium titanium lactate, titanium chloride, titanium carbonate, ammonium titanium chloride, titanium triethanolamine, or combinations of any two or more of any of the aforementioned.

Other crosslinkers can include copper compounds, glyoxal, zirconium compounds, antimony compounds, aluminum compounds, iron compounds, chromium compounds, hafnium compounds, niobium compounds, antimony compounds, p-benzoquinone, dicarboxylic acids and their salts, phosphite compounds and phosphate compounds.

In one embodiment, zirconium compounds include, but are not limited to, ammonium zirconium carbonate, sodium zirconium carbonate, potassium zirconium carbonate, ammonium zirconium fluoride, ammonium zirconium chloride, zirconium ammonium citrate, zirconium chloride, tetrakis (triethanolamine)zirconate, zirconium carbonate, zirconyl ammonium carbonate, sodium zirconium lactate, zirconium lactate, zirconium acetylacetonate, zirconium diisopropylamine, zirconium 2-ethylhexanoate, zirconium acetate, zirconium neodecanoate, zirconium complex of hydroxyethyl glycine, zirconium malonate, zirconium propionate, zirconium tartrate, chromium citrate, aluminum acetate, potassium pyroantimonate or any combination of the foregoing.

In one embodiment, the copper compound is a copper salt, more typically a water soluble copper salt, including but not limited to copper carbonate, copper sulfate, copper oxide, copper carboxylates, copper halides, copper sulphadiazine, copper nitrate, copper gluconate, copper pyrithione, copper peptides, copper silicates or copper salts of quinolines and their derivatives. In one embodiment, the copper compound comprises one or more copper chelates or one or more copper esters. Typically, the copper salts comprise copper (II) carbonate or copper (II) sulfate.

Suitable aluminum compounds include compounds that are soluble in an aqueous medium. In one embodiment, the aluminum compound is an aluminum salt, more typically a water soluble aluminum salt, including but not limited to aluminum acetate, aluminum lactate, aluminum chloride, sodium aluminate, aluminum sulfate, aluminum ammonium sulfate, aluminum nitrate, aluminum fluoride, aluminum phosphate, aluminum hydroxide, aluminum chlorohydrate, potassium aluminum sulfate, aluminum dichlorohydrate, aluminum sesquichlorohydrate, aluminum chlorohydrex propylene glycol, aluminum dichlorohydrex propylene glycol, aluminum sesquichlorohydrex propylene glycol, aluminum chlorohydrex polyethylene glycol, aluminum dichlorohydrex polyethylene glycol, aluminum sesquichlorohydrex polyethylene glycol.

Suitable dicarboxylic acids include but are not limited to adipic acid, glutaric acid, succinic acid, isomers thereof or salts thereof. Typically, the dicarboxylic acid is adipic acid and salts thereof.

Suitable phosphite compounds include compounds that are soluble in an aqueous medium. In one embodiment, the phosphite compound is an alkyl phosphite including but not limited to triethyl phosphite, trimethyl phosphate, dimethyl phosphite or diethyl phosphite. Typically, the phosphite compound is triethyl phosphite.

Suitable phosphate compounds include compounds soluble in an aqueous medium, including but not limited to metaphosphate salts. Typically, the phosphate compound is trisodium trimetaphosphate. In another embodiment the crosslinking agent includes but is not limited to organophosphorus compounds, phosphine compounds, phosphine oxide compounds, phosphinite compounds, phosphonite compounds, phosphinate compounds and phosphonate compounds.

The absence of additional crosslinkers is desirable in some embodiments of the present invention as there is no added cost of including crosslinkers. In addition, crosslinkers such as borax have been identified by some government agencies as toxic to humans.

By use of the method of the present invention, the viscosity can be maintained in a desirable range. Typically, this range is greater than about 100 centipoise (cps) @ 100/sec for temperatures greater than 200 degrees Fahrenheit (° F.). In some embodiment, this range is greater than about 100 centipoise (cps) @ 100/sec for temperatures greater than 250 degrees Fahrenheit (° F.). In some embodiment, this range is greater than about 200 centipoise (cps) @ 100/sec for temperatures greater than 200 degrees Fahrenheit (° F.). The dramatic rise in viscosity in the polymer-brine systems and crosslinking of the polysaccharide therein is unexpected.

Example described hereinbelow is intended to further illustrate the present invention and should not be construed as more limiting than the appended claims.

EXAMPLE

This example illustrates that cationic polysaccharides such as cationic guar gum is used to increase the viscosity of brines containing calcium salts and zinc salts.

Example 1

1.92 gm of DV-7815 (cationic guar, hydroxypropyl trimethyl ammonium chloride with a Degree of substitution (DS) of from about 0.2 to about 0.25) was added to 400 ml of 11.5 ppg (density of 11.5 lb/gal) calcium chloride brine in a blender. During mixing, 0.8 ml of acetic acid buffer was added. The acetic acid buffer is an acetic acid/sodium acetate blend as follows: 17.5% by wt. sodium acetate trihydrate, 7.5% by wt. glacial acetic acid, 75% by wt. deionized water. The brine solution was mixed at 2500 rpm for 2 minutes and then set aside. The viscosity after 2 hours is 62 cP @ 511/sec, 75 F using OFITE model 900 viscometer. 200 gm of the above solution was then taken and 0.5 ml of triethanolamine (85%) was added. The viscosity of the solution slowly increased with time. The pH of the solution was about 6.5. 45 gm of the solution of put in a high temperature, high pressure viscometer and heated slowly from room temperature to about 300 F over 2 hour period.

The viscosity results are tabulated in the following Table 1.

TABLE 1

| Time(min) | 5 | 10 | 15 | 20 | 30 | 45 | 60 | 75 | 90 |
|---|---|---|---|---|---|---|---|---|---|
| Viscosity, cP @ 100/sec | 658 | 732 | 750 | 687 | 439 | 147 | 111 | 1065 | 538 |
| T(F.) | 85 | 93 | 107 | 120 | 145 | 181 | 217 | 250 | 278 |

Example 2

250 ml of 14.2 ppg (density of 14.2 lb/gal) CaBr2 brine was placed in a small blender jar (500 ml). While mixing, 1.2 gm of DV-7815 (cationic guar) was added and then 2 ml of the acetic acid buffer was added and then mixed for 5 minutes.

The viscosity after 2 hours of the above solution was 53 cP @ 511/sec at room temperature (~70-75 F). The viscosity was measured using an OFITE model 900 using R1B1 geometry at 300 rpm. The pH of the solution was about 2.8 to 3.0.

200 gm of the above solution was poured in the blender jar. While mixing, 1 ml of triethanolamine (85%) was added. The pH of the solution was about 6.5. About 45 ml of the solution was transferred to a cup of an OFITE high temperature, high pressure viscometer. The sample was heated from room temperature to 200 F and then maintained for 2 hours. The viscosity and temperature were monitored as a function of time, as shown in Table 2.

TABLE 2

| Time(min) | 5 | 10 | 15 | 20 | 30 | 60 | 90 | 120 |
|---|---|---|---|---|---|---|---|---|
| Viscosity, cP @ 100/sec | 117 | 189 | 1473 | 2070 | 1843 | 1693 | 1639 | 1488 |
| T(F.) | 75 | 140 | 183 | 200 | 200 | 200 | 200 | 200 |

Example 3

250 ml of 14.2 ppg (density of 14.2 lb/gal) CaBr2 brine was placed in a small blender jar (500 ml). While mixing, 1.2 gm of DV-7815 (cationic guar) was added and then 2 ml of the acetic acid buffer was added and mixed for 5 minutes.

The viscosity after 2 hours of the above solution is 53 cP @ 511/sec at room temperature (~70-75 F). The viscosity was measured using an OFITE model 900 using R1B1 geometry at 300 rpm.

200 gm of the above solution was poured in the blender jar. While mixing 1 ml of triethanolamine (85%) was added. About 45 ml of the solution was transferred to a cup of an OFITE high temperature, high pressure viscometer. The sample was heated from room temperature to 225 F and then maintained for 2 hours. The viscosity and temperature were monitored as a function of time.

TABLE 3

| Time(min) | 5 | 10 | 15 | 20 | 30 | 60 | 90 | 120 |
|---|---|---|---|---|---|---|---|---|
| Viscosity, cP @ 100/sec | 112 | 561 | 1542 | 1571 | 1532 | 1472 | 270 | 200 |
| T(F.) | 87 | 162 | 209 | 225 | 225 | 225 | 225 | 225 |

Example 4

250 ml of 11.5 ppg (density of 11.5 lb/gal) CaCl2 brine was placed in a small blender jar (500 ml). While mixing, 1.2 gm of DV-7815 (cationic guar) was added and 2 ml of an acetic acid/sodium acetate buffer was added and mixed for 5 minutes.

The viscosity after 2 hours of the above solution is 53 cP @ 511/sec at room temperature (~70-75 F). The viscosity was measured using an OFITE model 900 using R1B1 geometry at 300 rpm. The pH of the solution was about 2.0.

200 gm of the above solution was poured in the blender jar. While mixing 1 ml of triethanolamine (85%) was added. The pH of the solution is about 6.2 to about 6.3. About 45 ml of the solution was transferred to a cup of an OFITE high temperature, high pressure viscometer. The sample was heated in steps from room temperature to 150 F, 175 F, 200 F, 225 F and 250 F every 20 minutes. The viscosity and temperature were monitored as a function of time.

TABLE 4

| Time(min) | 1 | 20 | 40 | 60 | 80 | 100 |
|---|---|---|---|---|---|---|
| Viscosity, cp @ 100/sec | 487 | 741 | 576 | 558 | 777 | 930 |
| T(F.) | 81 | 150 | 175 | 200 | 225 | 250 |

Example 5

250 ml of DI (deionized water) was taken in a small blender jar (500 ml) and 5 gm of potassium chloride was mixed to make a 2% KCl-water solution (monovalent salt-water solution). While mixing, 1.2 gm of DV-7815 (cationic guar) was added and then 2 ml of the acetic acid buffer was added and then mixed for 5 minutes.

The viscosity after 2 hours of the above solution is 28 cP @ 511/sec at room temperature (~70-75 F). The pH of the solution is 4.8. The viscosity was measured using an OFITE model 900 using R1B1 geometry at 300 rpm.

200 gm of the above solution was poured in the blender jar. While mixing, 1 ml of triethanolamine (85%) was added. The pH of the solution has increased to 8.5. The viscosity was 27 cP at 511/sec at room temperature. About 45 ml of the solution was transferred to a cup of an OFITE high temperature, high pressure viscometer. The sample was heated from room temperature to 200 F and then maintained for 2 hours. The viscosity and temperature were monitored as a function of time.

TABLE 5

| Time(min) | 5 | 10 | 15 | 20 | 30 | 60 | 90 | 120 |
|---|---|---|---|---|---|---|---|---|
| Viscosity, cp @ 100/sec | 60 | 29 | 21 | 18 | 15 | 13 | 16 | 18 |
| T(F.) | 75 | 132 | 170 | 187 | 200 | 200 | 200 | 200 |

Example 6

250 ml of 12.5 lb/gal NaBr brine (monovalent salt) was taken in a small blender jar (500 ml). While mixing, 1.2 gm of DV-7815 (cationic guar) was added and then 2 ml of the acetic acid buffer was added and then mixed for 5 minutes.

The viscosity after 2 hours of the above solution is 53 cP @ 511/sec at room temperature (~70-75 F). The pH of the solution is 4.2. The viscosity was measured using an OFITE model 900 using R1B1 geometry at 300 rpm.

200 gm of the above solution was poured in the blender jar. While mixing, 1 ml of triethanolamine (85%) was added. The pH of the solution has increased to 8.95. The viscosity was 51 cP at 511/sec at room temperature. About 45 ml of the solution was transferred to a cup of an OFITE high temperature, high pressure viscometer. The sample was heated from room temperature to 200 F and then maintained for 2 hours. The viscosity and temperature were monitored as a function of time.

Example 5 and 6 show that when only monovalent salts are used, viscosity increase is not seen as the pH is increased.

| Time(min) | 5 | 10 | 15 | 20 | 30 | 60 | 90 | 120 |
|---|---|---|---|---|---|---|---|---|
| Viscosity, cp @ 100/sec | 77 | 53 | 45 | 43 | 40 | 41 | 41 | 42 |
| T(F.) | 100 | 135 | 170 | 187.9 | 200 | 200 | 200 | 200 |

The present invention is well adapted to carry out the objects and attain the ends and advantages mentioned, as well as others inherent therein. While the invention has been depicted and described and is defined by reference to particular preferred embodiments of the invention, such references do not imply a limitation on the invention, and no such limitation is to be inferred. The invention is capable of considerable modification, alteration and equivalents in form and function, as will occur to those ordinarily skilled in the pertinent arts. The depicted and described preferred embodiments of the invention are exemplary only and are not exhaustive of the scope of the invention. Consequently, the invention is intended to be limited only by the spirit and scope of the appended claims, giving full cognizance to equivalents in all respects.

What is claimed is:

1. A method for viscosifying brine systems utilized in well servicing applications comprising:
    a) obtaining an aqueous brine system comprising a hydrated polysaccharide and at least one multivalent salt, wherein the density of the aqueous brine system is greater than about 10 pounds per gallon (ppg) and wherein the pH of the brine system is less than about 7, wherein the level of the at least one multivalent salt is from about 5 wt % to about 90 wt % based on the weight of the brine system, and
    b) adding an effective amount of an alkaline agent, thereby increasing the viscosity of the brine system,
    wherein the alkaline agent is selected from the group consisting of amines, alkali metal glycerophosphates, alkali metal orthophosphates, alkali metal hydroxides, carbonates, alkanolamines, silicates, citrates, phosphates, buffering solutions thereof and mixtures thereof,
    wherein said alkaline agent is used at a range of from about 0.1% to about 30%;
    wherein said multivalent salt comprises a calcium salt, a magnesium salt, a formate salt, a ferrous salt, a zinc salt or a mixture thereof; and
    wherein said polysaccharide comprises a cationic guar.

2. The method of claim 1 wherein the alkaline agent is an alkaline buffer.

3. The method of claim 1 wherein the alkaline agent is a base.

4. The method of claim 1 wherein the alkaline agent is an alkanolamine.

5. The method of claim 4 wherein the alkanolamine is a triethanolamine.

6. The method of claim 2 wherein the alkaline buffer is an aqueous solution of disodium phosphate and monosodium phosphate.

7. The method of claim 1 wherein the pH of the brine system in step a) is less than about 5.

8. The method of claim 1 wherein the pH of the brine system in step a) is less than about 4.

9. The method of claim 7 wherein the pH of the brine system in step b) is increased to greater than about 8.

10. The method of claim 8 wherein the pH of the brine system in step b) is increased to greater than about 6.

11. The method of claim 1 wherein the multivalent salt comprises calcium chloride, calcium bromide, calcium iodide, calcium sulfate, magnesium chloride, magnesium bromide, magnesium iodide, magnesium sulfate, calcium formate, magnesium formate, zinc formate, zinc chloride, zinc bromide, zinc iodide, zinc sulfate or any mixture thereof.

12. The method of claim 1, wherein the polysaccharide is present in an amount from about 0.01 wt % to about 10 wt % based on the total weight of the brine system.

13. The method of claim 12, wherein the polysaccharide is present in an amount from about 0.01 wt % to about 2 wt % based on the total weight of the brine system.

14. A method for viscosifying brine systems utilized in well servicing applications comprising:
   a) obtaining an aqueous brine system comprising at least one multivalent salt, wherein the density of the aqueous brine system is greater than about 10 pounds per gallon (ppg), wherein the level of the at least one multivalent salt is from about 5 wt % to about 90 wt % based on the weight of the brine system;
   b) adding a polysaccharide;
   c) adding an effective amount of an acid buffering agent to the brine system to lower the pH of the brine system, whereby the polysaccharide is capable of hydrating into the brine system; and
   d) adding an effective amount of an alkaline agent, thereby increasing the viscosity of the brine system,
   wherein the alkaline agent is selected from the group consisting of amines, alkali metal glycerophosphates, alkali metal orthophosphates, alkali metal hydroxides, carbonates, alkanolamines, silicates, citrates, phosphates, buffering solutions thereof and mixtures thereof,
   wherein said alkaline agent is used at a range of from about 0.1% to about 30%;
   wherein said multivalent salt comprises a calcium salt, a magnesium salt, a formate salt, a ferrous salt, a zinc salt or a mixture thereof, and
   wherein said polysaccharide comprises a cationic guar.

15. The method of claim 14, wherein the brine system has a density of from about 14 ppg to about 19.5 ppg.

16. A method for preparing a viscosified brine system utilized in a well servicing applications comprising:
   a) adding a polysaccharide to an aqueous brine solution, the brine solution comprising:
      (i) at least one multivalent water soluble salt present at from about 5 wt % to about 90 wt % based on the weight of the brine solution,
      (ii) a density between about 10 pounds per gallon (ppg) and 20 ppg, and
      (iii) a pH value of less than about 7,
      whereby the polysaccharide is capable of hydrating into the brine solution; and
   b) adding an alkaline agent to increase the pH of the brine solution, thereby increasing the viscosity of the brine system,
   wherein said alkaline agent is used at a range of from about 0.1% to about 30%;
   wherein the alkaline agent is selected from the group consisting of amines, alkali metal glycerophosphates, alkali metal orthophosphates, alkali metal hydroxides, carbonates, alkanolamines, silicates, citrates, phosphates, buffering solutions thereof and mixtures thereof,
   wherein the multivalent salt comprises a calcium salt, a magnesium salt, a formate salt, a zinc salt or any mixture thereof, and
   wherein the polysaccharide comprises a cationic polysaccharide or is hydroxyalkyltrimethylammonium guar.

17. The method of claim 16, wherein the brine solution has a density of from about 14 ppg to about 19.5 ppg.

18. The method of claim 16 wherein the multivalent salt comprises calcium chloride, calcium bromide, calcium iodide, calcium sulfate, magnesium chloride, magnesium bromide, magnesium iodide, magnesium sulfate, calcium formate, magnesium formate, zinc formate, zinc chloride, zinc bromide, zinc iodide, zinc sulfate or any mixture thereof.

19. The method of claim 16, wherein the polysaccharide is present in an amount from about 0.01 wt % to about 10 wt % based on the total weight of the brine system.

20. The method of claim 19, wherein the polysaccharide is present in an amount from about 0.01 wt % to about 2 wt % based on the total weight of the brine system.

21. The method of claim 16, wherein the cationic polysaccharide is prepared by the reaction of a reactive quaternary ammonium compound with a polysaccharide or polysaccharide derivative selected from the group consisting of guar, hydroxyalkyl guar, carboxyalkyl guar, carboxyalkyl hydroxyalkyl guar, hydrophobically modified guar, hydrophobically modified hydroxyalkyl guar, hydrophobically modified carboxyalkyl guar, hydrophobically modified carboxyalkyl hydroxyalkyl guar, pectin, alginates, locust bean gum, gum arabic, gum ghatti, gum acacia, carrageenan, hydroxyalkyl cellulose, carboxyalkyl hydroxyalkyl cellulose, carboxyalkyl cellulose, alkyl ethers of cellulose, hydroxyalkyl methyl cellulose, hydrophobically modified hydroxyalkyl cellulose, hydrophobically modified carboxyalkyl hydroxyalkyl cellulose, hydrophobically modified carboxyalkyl cellulose, hydrophobically modified alkyl ethers of cellulose, hydrophobically modified hydroxyalkyl methyl cellulose, starch, gum tragacanth, gum karaya, tara gum, tamarind gum, xanthan gum, welan gum, and succinoglucans, and mixtures thereof.

22. The method of claim 16, wherein the cationic polysaccharide has a weight average molecular weight from about 100,000 to about 3,000,000 Daltons.

23. The method of claim 22, wherein the cationic polysaccharide has a weight average molecular weight from about 1,000,000 to about 2,000,000 Daltons.

24. The method of claim 16, wherein the viscosified brine system has a viscosity of from about 100 to about 15000 cps.

25. The method of claim 24, wherein the viscosified brine system has a viscosity of from about 200 to about 5000 cps.

26. A method for preparing a viscosified brine system utilized in well servicing applications comprising:
   a) adding a polysaccharide to an aqueous brine solution, the brine solution comprising:
      (i) at least one multivalent water soluble salt present at from about 5 wt % to about 90 wt % based on the weight of the brine solution;
      (ii) a density between about 10 pounds per gallon (ppg) and 20 ppg;
   b) adding an effective amount of an acid to the brine solution, whereby the polysaccharide is capable of hydrating into the brine solution; and
   c) adding an alkaline agent to the brine system to increase the pH of the brine system to greater than 6, thereby viscosifying the brine system,
   wherein said alkaline agent is used at a range of from about 0.1% to about 30%;
   wherein the alkaline agent is selected from the group consisting of amines, alkali metal glycerophosphates, alkali metal orthophosphates, alkali metal hydroxides, carbonates, alkanolamines, silicates, citrates, phosphates, buffering solutions thereof and mixtures thereof, wherein the multivalent salt comprises a calcium salt, a magnesium salt, a formate salt, a zinc salt or any mixture thereof, and wherein the polysaccharide comprises a cationic polysaccharide or is hydroxyalkyltrimethylammonium guar.

27. The method of claim 26 wherein the acid is selected from the group consisting of sulfuric acid, citric acid, acetic acid, formic acid, lactic acid, malic acid, glycolic acid, tartaric acid, nitric acid, hydrochloric acid, sulfamic acid, phosphoric acid, oxalic acid, sodium bisulfate, mixtures thereof, and a buffer solution including any of the foregoing.

28. The method of claim 26 wherein the acid is an acid buffer.

29. The method of claim 26 wherein the alkaline agent is an alkaline buffer.

* * * * *